US011006107B2

(12) United States Patent
Uejima

(10) Patent No.: US 11,006,107 B2
(45) Date of Patent: May 11, 2021

(54) STATE PREDICTION CONTROL APPARATUS AND STATE PREDICTION CONTROL METHOD

(71) Applicant: Hitachi Information & Telecommunication Engineering, Ltd., Yokohama (JP)

(72) Inventor: Toshiaki Uejima, Yokohama (JP)

(73) Assignee: Hitachi Information & Telecommunication Engineering, Ltd., Yokohama (JP)

( * ) Notice: Subject to any disclaimer, the term of this patent is extended or adjusted under 35 U.S.C. 154(b) by 0 days.

(21) Appl. No.: 16/477,447

(22) PCT Filed: May 29, 2017

(86) PCT No.: PCT/JP2017/019902
§ 371 (c)(1),
(2) Date: Jul. 11, 2019

(87) PCT Pub. No.: WO2018/220673
PCT Pub. Date: Dec. 6, 2018

(65) Prior Publication Data
US 2019/0387223 A1    Dec. 19, 2019

(51) Int. Cl.
*H04N 19/11* (2014.01)
*H04N 19/124* (2014.01)
(52) U.S. Cl.
CPC ......... *H04N 19/11* (2014.11); *H04N 19/124* (2014.11)
(58) Field of Classification Search
CPC combination set(s) only.
See application file for complete search history.

(56) References Cited

U.S. PATENT DOCUMENTS

2016/0325743 A1\* 11/2016 Schmudderich ... G06K 9/00771
2018/0068206 A1\*  3/2018 Pollach ............... G06K 9/3233
(Continued)

FOREIGN PATENT DOCUMENTS

CN   109690619 A    4/2019
EP   3 324 360 A1   5/2018
(Continued)

OTHER PUBLICATIONS

International Search Report (PCT/ISA/210) issued in PCT Application No. PCT/JP2017/019902 dated Aug. 22, 2017 with English translation (three (3) pages).
(Continued)

*Primary Examiner* — Md N Haque
(74) *Attorney, Agent, or Firm* — Crowell & Moring LLP

(57) ABSTRACT

A state prediction control apparatus acquires first sensor information obtained by observing a state of an observation object at a first-clock-time by an observation sensor, reads a state series from a state series dictionary that defines a series of plural state changes accompanying a lapse of time corresponding to the kind of the observation object, obtains a route according to an objective matching the observation object and a target parameter for achieving the objective, predicts a state at a prediction-clock-time that is beyond the first-clock-time, compares second sensor information obtained at a second-clock-time after the first-clock-time and the prediction state, and outputs a control parameter defined based on the comparison result in order that a state at the prediction-clock-time comes close to the objective and the target parameter to a control unit that affects state change of the observation object.

8 Claims, 10 Drawing Sheets

(56) References Cited

U.S. PATENT DOCUMENTS

2018/0292328 A1* 10/2018 Karube ................ G01N 21/88
2019/0138827 A1   5/2019 Uejima

FOREIGN PATENT DOCUMENTS

| JP | 63-91018 A | 4/1988 |
|----|------------|--------|
| JP | 2000-35804 A | 2/2000 |
| JP | 2005-44352 A | 2/2005 |
| JP | 2007-299312 A | 11/2007 |
| JP | 2014-63273 A | 4/2014 |
| JP | 2016-101117 A | 6/2016 |
| WO | WO 2017/051480 A1 | 3/2017 |

OTHER PUBLICATIONS

Japanese-language Written Opinion (PCT/ISA/237) issued in PCT Application No. PCT/JP2017/019902 dated Aug. 22, 2017 (four (4) pages).
Extended European Search Report issued in European Application No. 17912304.7 dated Jun. 22, 2020 (11 pages).
Chinese-language Office Action issued in Chinese Application No. 201780083604.9 dated Jul. 28, 2020 with English translation (23 pages).

* cited by examiner

FIG. 3

| OBJECT | | | CUCUMBER | | | | |
|---|---|---|---|---|---|---|---|
| OBJECTIVE 1 | | | FORCING CULTURE | | | | |
| TARGET PARAMETER | SEEDING | NOVEMBER | | | | | |
| | SETTLED PLANTING | DECEMBER | | | | | |
| | HARVESTING | JANUARY | TARGET ROUTE 1a | TARGET ROUTE 1b | TARGET ROUTE 1c | TARGET ROUTE 1d | |
| | | | OBJECTIVE ARRIVAL PROBABILITY p(1a) | p(1b) | p(1c) | p(1d) | |
| | | FEBRUARY | TARGET ROUTE 2a | TARGET ROUTE 2b | TARGET ROUTE 2c | TARGET ROUTE 2d | |
| | | | OBJECTIVE ARRIVAL PROBABILITY p(2a) | p(2b) | p(2c) | p(2d) | |
| OBJECTIVE 2 | | | OVERWINTERING CULTURE | | | | |
| TARGET PARAMETER | SEEDING | SEPTEMBER | | | | | |
| | SETTLED PLANTING | OCTOBER | | | | | |
| | HARVESTING | NOVEMBER | TARGET ROUTE 3a | TARGET ROUTE 3b | TARGET ROUTE 3c | — | |
| | | | OBJECTIVE ARRIVAL PROBABILITY p(3a) | p(3b) | p(3c) | — | |
| OBJECTIVE 3 | | | SEMI-FORCING CULTURE | | | | |
| TARGET PARAMETER | SEEDING | FEBRUARY | | | | | |
| | SETTLED PLANTING | MARCH | | | | | |
| | HARVESTING | APRIL | TARGET ROUTE 4a | TARGET ROUTE 4b | TARGET ROUTE 4c | TARGET ROUTE 4d | |
| | | | OBJECTIVE ARRIVAL PROBABILITY p(4a) | p(4b) | p(4c) | p(4d) | |
| | | MAY | TARGET ROUTE 5a | TARGET ROUTE 5b | TARGET ROUTE 5c | — | |
| | | | OBJECTIVE ARRIVAL PROBABILITY p(5a) | p(5b) | p(5c) | — | |

THE OBJECTIVE ARRIVAL PROBABILITY OF THE TARGET ROUTE 1a OF THE ABOVE EXAMPLE IS OBTAINED AS DESCRIBED BELOW FROM THE STATE TRANSITION PROBABILITY OF Fig. 4.
$p(1a) = p_{12} \cdot p_{23} \cdot p_{34} \cdot p_{45} \cdot p_{55} \cdot p_{56} \cdot p_{66} \cdot p_{66}$ IN THE ABOVE EXAMPLE, THE OBJECTIVE ARRIVAL PROBABILITY OF JANUARY BECOMES THE TOTAL VALUE OF THE OBJECTIVE ARRIVAL PROBABILITY OF THE TARGET ROUTE 1a, TARGET ROUTE 1b, TARGET ROUTE 1c, AND TARGET ROUTE 1d.

FIG. 4B

EXAMPLE OF STATE TRANSITION PROBABILITY
TABLE OF STATE SERIES DICTIONARY

|     | ω1  | ω2  | ω3  | ω4  | ω5  | ω6  | ω7  | ω8  | ω9  |
|-----|-----|-----|-----|-----|-----|-----|-----|-----|-----|
| ω1  | p11 | p12 | p13 | p14 | p15 | p16 | p17 | p18 | p19 |
| ω2  | p21 | p22 | p23 | p24 | p25 | p26 | p27 | p28 | p29 |
| ω3  | p31 | p32 | p33 | p34 | p35 | p36 | p37 | p38 | p39 |
| ω4  | p41 | p42 | p43 | p44 | p45 | p46 | p47 | p48 | p49 |
| ω5  | p51 | p52 | p53 | p54 | p55 | p56 | p57 | p58 | p59 |
| ω6  | p61 | p62 | p63 | p64 | p65 | p66 | p67 | p68 | p69 |
| ω7  | p71 | p72 | p73 | p74 | p75 | p76 | p77 | p78 | p79 |
| ω8  | p81 | p82 | p83 | p84 | p85 | p86 | p87 | p88 | p89 |
| ω9  | p91 | p92 | p93 | p94 | p95 | p96 | p97 | p98 | p99 |

FIG. 5

| SENSOR KIND | OBJECT |
|---|---|
| CMOS SENSOR | CROP |
| LIGHT QUANTITY SENSOR | LIGHT QUANTITY |
| TEMPERATURE SENSOR | TEMPERATURE |
| HUMIDITY SENSOR | HUMIDITY |
| WATER SUPPLY QUANTITY SENSOR | WATER QUANTITY |
| FERTILIZER SUPPLY QUANTITY SENSOR | FERTILIZER SUPPLY QUANTITY |

FIG. 6A

| LIGHT QUANTITY SENSOR VALUE (lx) EXPECTATION VALUE - OBSERVATION VALUE | OUTPUT LIGHTING VOLTAGE (V) CONTROL INFORMATION LIGHTING VOLTAGE AT THE TIME OF OBSERVATION → LIGHTING VOLTAGE AFTER CONTROL | | | | |
|---|---|---|---|---|---|
| -1,199 OR LESS to -800 | 0 → 12 | 3 → 12 | 6 → 12 | 9 → 12 | 12 → 12 |
| -799 ~ -500 | 0 → 9 | 3 → 12 | 6 → 12 | 9 → 12 | 12 → 12 |
| -499 ~ -200 | 0 → 6 | 3 → 9 | 6 → 12 | 9 → 12 | 12 → 12 |
| -199 ~ -1 | 0 → 3 | 3 → 6 | 6 → 9 | 9 → 12 | 12 → 12 |
| 0 ~ 199 | 0 → 0 | 3 → 0 | 6 → 3 | 9 → 6 | 12 → 9 |
| 200 ~ 499 | 0 → 0 | 3 → 0 | 6 → 0 | 9 → 3 | 12 → 6 |
| 500 ~ 799 | 0 → 0 | 3 → 0 | 6 → 0 | 9 → 0 | 12 → 3 |
| 800 to 1,199 OR MORE | 0 → 0 | 3 → 0 | 6 → 0 | 9 → 0 | 12 → 0 |

FIG. 6B

| TEMPERATURE SENSOR VALUE (°C) EXPECTATION VALUE-OBSERVATION VALUE | OUTPUT HEATER CURRENT VALUE (A) CONTROL INFORMATION HEATER CURRENT AT THE TIME OF OBSERVATION → HEATER CURRENT AFTER CONTROL | | | | | |
|---|---|---|---|---|---|---|
| -20 OR LESS to -15.1 | 0 → 35 | 15 → 40 | 20 → 40 | 25 → 40 | 30 → 40 | 35 → 40 | 40 → 40 |
| -15 ~ -10.1 | 0 → 30 | 15 → 40 | 20 → 40 | 25 → 40 | 30 → 40 | 35 → 40 | 40 → 40 |
| -10 ~ -5.1 | 0 → 25 | 15 → 40 | 20 → 40 | 25 → 40 | 30 → 40 | 35 → 40 | 40 → 40 |
| -5 ~ -0.1 | 0 → 15 | 15 → 30 | 20 → 35 | 25 → 40 | 30 → 40 | 35 → 40 | 40 → 40 |
| 0 ~ 4.9 | 0 → 0 | 15 → 0 | 20 → 15 | 25 → 15 | 30 → 20 | 35 → 25 | 40 → 30 |
| 5 ~ 9.9 | 0 → 0 | 15 → 0 | 20 → 0 | 25 → 0 | 30 → 15 | 35 → 15 | 40 → 20 |
| 10 ~ 14.9 | 0 → 0 | 15 → 0 | 20 → 0 | 25 → 0 | 30 → 0 | 35 → 15 | 40 → 15 |
| 15 to 19.9 OR MORE | 0 → 0 | 15 → 0 | 20 → 0 | 25 → 0 | 30 → 0 | 35 → 0 | 40 → 0 |

FIG. 6C

| HUMIDITY SENSOR VALUE (%) EXPECTATION VALUE-OBSERVATION VALUE | OUTPUT HUMIDIFICATION CONTROL INFORMATION HUMIDIFICATION INTENSITY | OUTPUT DEHUMIDIFICATION CONTROL INFORMATION DEHUMIDIFICATION INTENSITY |
|---|---|---|

FIG. 6D

| WATER SUPPLY QUANTITY SENSOR VALUE (l/min) EXPECTATION VALUE-OBSERVATION VALUE | OUTPUT VALVE ANGLE (°) CONTROL INFORMATION VALVE ANGLE AT THE TIME OF OBSERVATION → VALVE ANGLE AFTER CONTROL |
|---|---|

| FERTILIZER SUPPLY QUANTITY SENSOR VALUE (mg) EXPECTATION VALUE-OBSERVATION VALUE | OUTPUT NOZZLE FERTILIZER SUPPLY QUANTITY (ml) CONTROL INFORMATION NOZZLE FERTILIZER SUPPLY QUANTITY AT THE TIME OF OBSERVATION → NOZZLE FERTILIZER SUPPLY QUANTITY AFTER CONTROL |
|---|---|

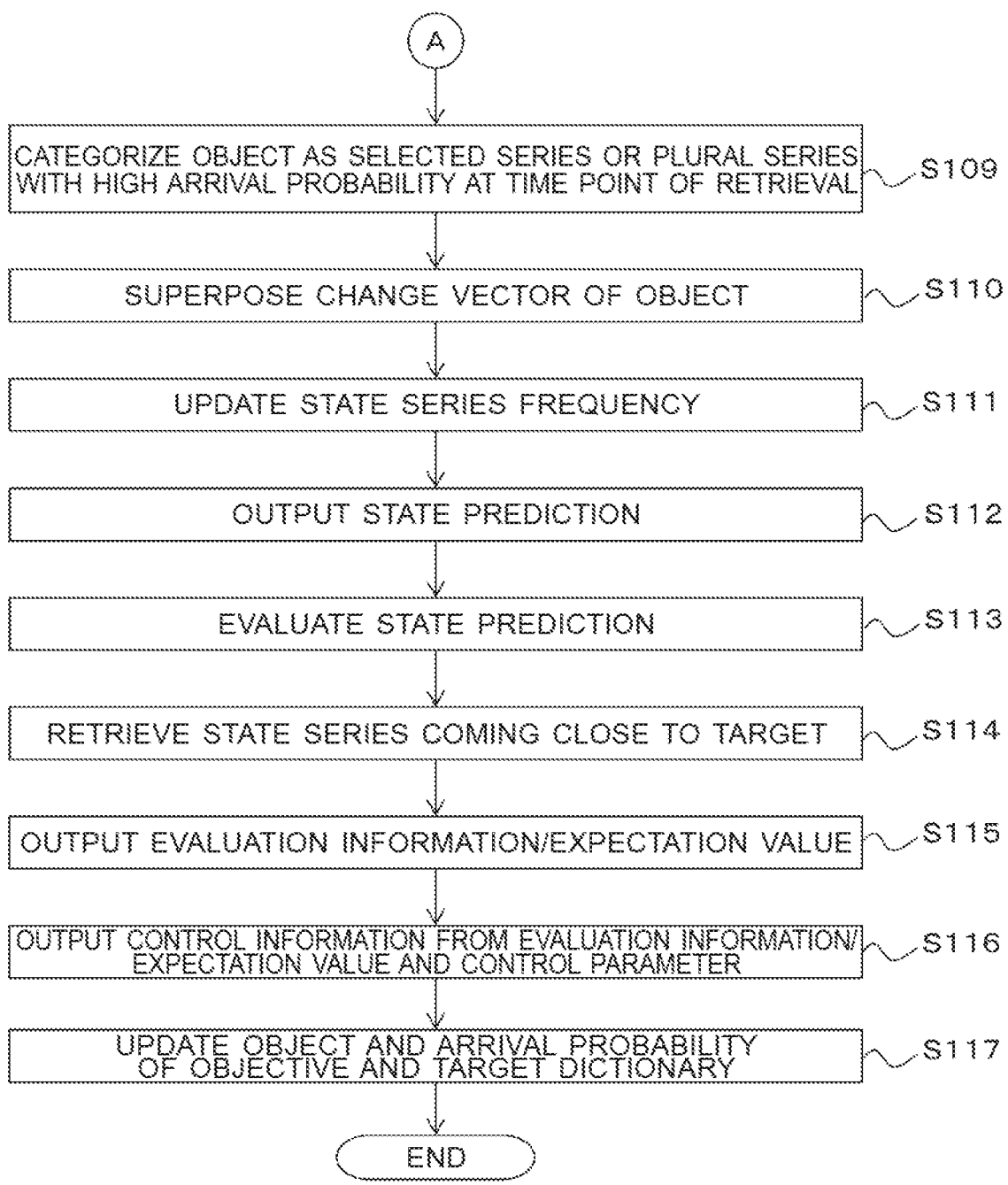

STATE PREDICTION CONTROL APPARATUS AND STATE PREDICTION CONTROL METHOD

TECHNICAL FIELD

The present invention relates to a state prediction control apparatus and a state prediction control method, and relates particularly to a technology which predicts change in the state of an observation object based on an output from an observation sensor.

BACKGROUND ART

Patent Literature 1 discloses a technology which estimates the physical quantity of an object based on captured image by a particle filter method and estimates the position of an object by a condensation method by taking a quantity related to the feature quantity of the object as a weight.

Patent Literature 2 discloses a technology in which a three-dimensional model comprised of plural feature points with three-dimensional coordinate values and partial image information representing a partial image related to each feature point is projected into a two-dimensional observation space, the state quantity of the three-dimensional model is estimated using a feature point set selected in the two-dimensional observation space, the estimated three-dimensional model state is projected into the observation space, and the adaptability is repeatedly calculated to estimate the state quantity of the three-dimensional model.

In Patent Literature 3, an area of interest for determining the presence of a target is sequentially set in plural positions in an image, a reference position of a part of a case when it is assumed that a target is present in the area of interest is set based on a deformable part model, and a deformation cost that is a value representing the degree of deviation from the reference position is calculated for each of detected parts. Then, such technology is proposed in which, on the condition that plural parts of a same kind whose calculated deformation costs are within a prescribed range are present, the area of interest is determined to be a target area where a target constituting a group is present.

CITATION LIST

Patent Literature

Patent Literature 1: Japanese Patent Application Laid-Open No. 2005-44352
Patent Literature 2: Japanese Patent Application Laid-Open No. 2007-299312
Patent Literature 3: Japanese Patent Application Laid-Open No. 2014-63273

SUMMARY OF INVENTION

Technical Problem

According to Patent Literatures 1, 2, and 3, there is a problem that, even though the position and state of an object could be predicted, positive working for making the object close to the target cannot be effected when the object deviates from a future target value.

The present invention has been achieved to solve the problem described above, and its object is to provide a technology for predicting the state of an observation object and making the state prediction close to a target value.

Solution to Problem

In order to solve achieve the purpose described above, the present invention has configurations described in claims. An aspect of a state prediction control apparatus related to the present invention is characterized to include, a sensor information acquisition section that acquires first sensor information obtained by observing a state of an observation object at a first clock time by an observation sensor, a model dictionary storage section that stores a model dictionary that relates the kind of the observation sensor and an observation object that is determined directly from an output of the observation sensor; an object identification section that refers to the model dictionary and identifies the kind of the observation object based on the first sensor information; an objective and target dictionary storage section that stores an objective and target dictionary that defines an objective of the observation object and a target parameter for achieving the objective; a state series dictionary storage section that stores a state series dictionary that defines a series of plural state changes accompanying a lapse of time corresponding to the kind of the observation object; a state prediction section that reads a state series that defines a different state of a different clock time of the identified observation object by plural numbers from the state series dictionary, reads an objective and a target parameter of the observation object from the objective and target dictionary, obtains a route according to the objective and the target parameter having been read among the state series, and predicts a state of the observation object at a prediction clock time that is beyond the first clock time to obtain a prediction state; and a prediction evaluation section that compares second sensor information and the prediction state, the second sensor information being obtained by observing the observation object by the observation sensor at a second clock time that is after the first clock time, and outputs evaluation information of an observation state of the observation object at the prediction clock time and deviation to the objective and the target parameter based on the comparison result.

Advantageous Effect of Invention

According to the present invention, it is possible to provide a technology for predicting the state of an observation object and making the state prediction close to a target value. Also, problems and solutions other than those described above will be clarified by the following embodiments.

BRIEF DESCRIPTION OF DRAWINGS

FIG. 3 is a drawing that shows an example of an objective and target dictionary.

FIG. 4B is a drawing that shows an example of an update of the state series data stored in the state series dictionary.

FIG. 5 is a drawing that shows an example of a model dictionary that defines an object.

FIG. 6A is a drawing that shows an example of a control parameter outputted to lighting.

FIG. 6B is a drawing that shows an example of a control parameter outputted to a heater.

FIG. 6C is a drawing that shows an example of a control parameter outputted to a humidifying-dehumidifying device.

FIG. 6D is a drawing that shows an example of a control parameter outputted to a water supply valve.

FIG. 8 is a flowchart that shows a flow of a process executing state prediction control with respect to growth of a crop using a state prediction control apparatus according to the present embodiment.

DESCRIPTION OF EMBODIMENT

Figure 1:
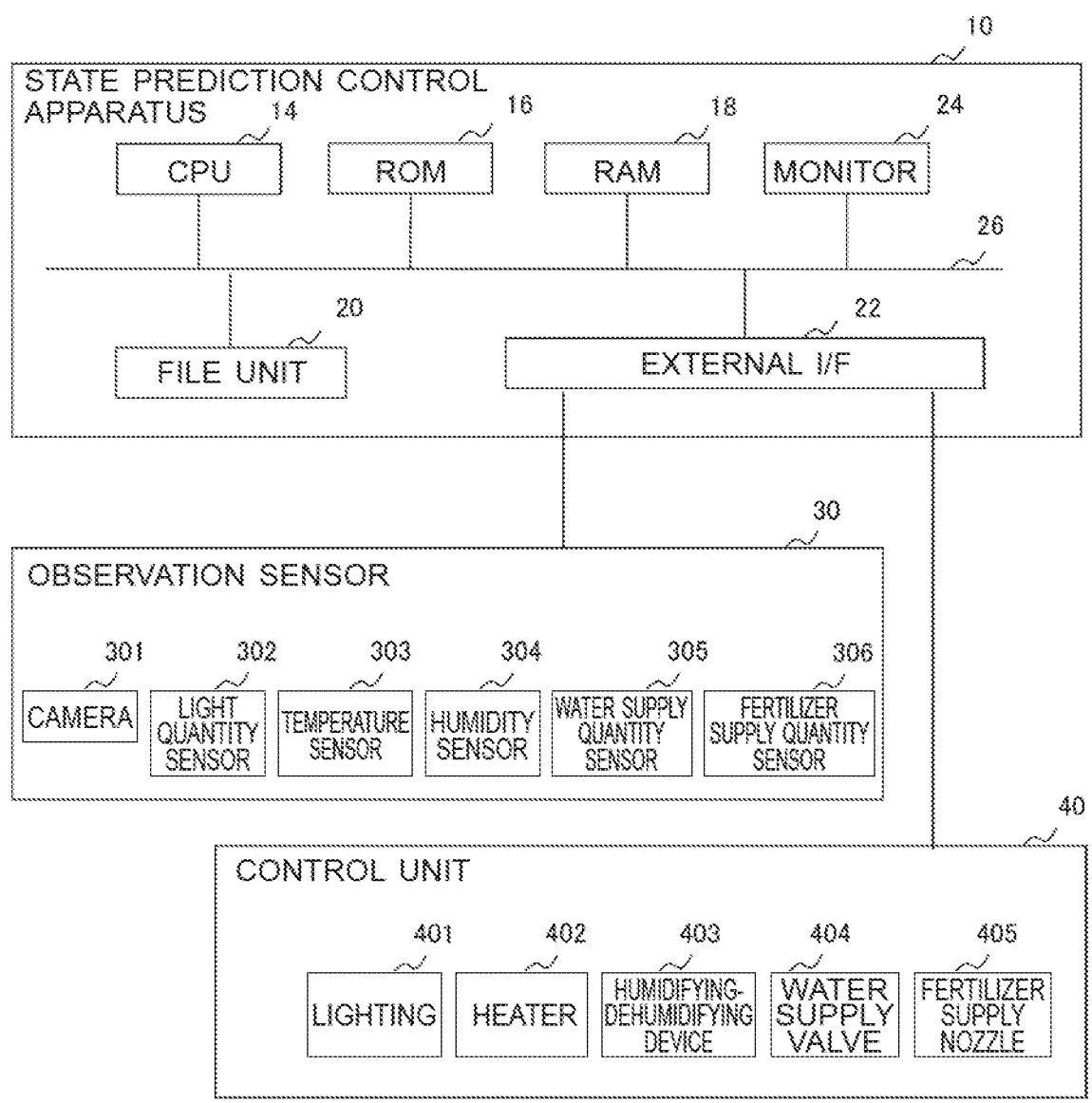
FIG. 1 is a hardware configuration diagram of a state prediction control apparatus.

A preferred embodiment of the present invention will be explained in detail referring to the drawings below. Explanation will be made exemplifying a case of fixed-point photographing a crop as an object and executing growth observation of a crop for example growth prediction and abnormity monitoring of a crop, and state prediction and abnormity monitoring of the crop growth environment.

In this description, "object" means one that is directly observed from sensor information outputted by each of the observation sensors. For example, when a CMOS sensor is included as an observation sensor, a crop (or a growth condition) becomes an object as one that is directly observed from the sensor information. In a similar manner, the object is the temperature in the case of a temperature sensor, the object is the light quantity in the case of a light quantity sensor, and the object is water supply value in the case of a water supply quantity sensor.

Also, in the explanation below, a control object will be growth of a crop, and a control parameter(s) is(are) at least one of growth quantity of crop, water supply quantity, room temperature, humidity, light quantity, and fertilizer supply quantity. Further, out of the growth (state) of a cultivation object, sprouting, development, flowering, fruition, and ripeness for example are made a (state) mode, and the target value in each mode is made objective information. In a case of a crop, since the image of the crop observed by a CMOS sensor, the light quantity observed by a light quantity sensor, the temperature observed by a temperature sensor, and the water quantity observed by a water quantity sensor become the objects, these objects are observed, and the change is predicted.

As a feature of the prediction control technology, objective control is executed. Control is executed so as to trace not only the change speed and the change acceleration of the observed value but also a target for accomplishing an objective.

FIG. 1 is a hardware configuration diagram of a state prediction control apparatus according to the present embodiment. As shown in FIG. 1, a state prediction control apparatus 10 according to the present embodiment is configured as a computer in which each of a CPU 14 that executes a calculation process for predicting the state change of an object, a ROM 16 and a RAM 18 as a data storage device, a file unit 20 (the file unit may be configured of an HDD for example), an external interface (I/F) 22, and a monitor 24 are connected to each other through a bus 26, and are connected so as to be capable of transmitting and receiving commands and data.

In the ROM 16, programs such as a process routine are store beforehand. Also, the state prediction control apparatus 10 according to the present embodiment includes in addition to the configuration described above, a number of constituent elements of the electrical system such as a power supply unit. It is noted that since they are widely known or general, detailed explanation will be omitted.

At least one of observation sensors 30 is connected to the external I/F 22. The observation sensor 30 is a sensor for acquiring state information of an object that is a control object of the state prediction control apparatus 10. As the observation sensor 30, there are a CMOS sensor 301, a light quantity sensor 302, a temperature sensor 303, a humidity sensor 304, a water supply quantity sensor 305, and a fertilizer supply quantity sensor 306 for example.

Also, a control unit 40 is connected to the external I/F 22. When the object is growth of a crop, the control unit 40 is a device that generates an environment affecting the state change of the growth of the crop. For example, as the control unit 40, there are lighting 401, a heater 402, a humidifying-dehumidifying device 403, a water supply valve 404, and a fertilizer supply nozzle 405.

Figure 2:
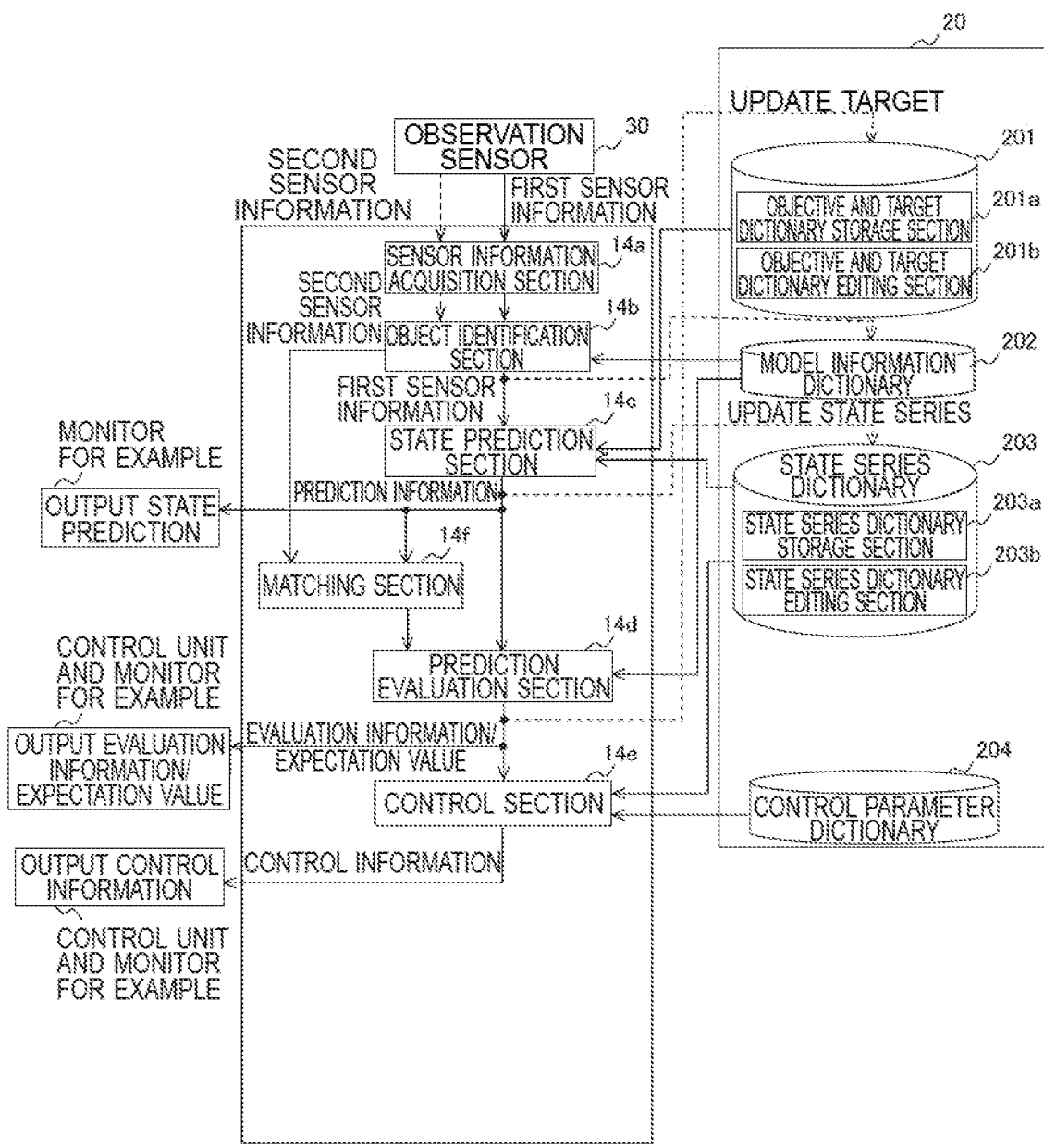
FIG. 2 is a functional block diagram that shows a configuration of a state prediction control program executed in the state prediction control apparatus.

FIG. 2 is a functional block diagram that shows a configuration of a state prediction control program executed in the state prediction control apparatus 10.

The state prediction control apparatus 10 includes a sensor information acquisition section 14a, an object identification section 14b, a state prediction section 14c, a prediction evaluation section 14d, a control section 14e, and a matching section 14f. Each of the constituent elements described above is configured by that the CPU 14 loads a program that achieves functions stored in the ROM 16 and the file unit 20 to the RAM 18 and executes the program.

Also, the file unit 20 includes an objective and target dictionary 201, a model information dictionary 202 that defines a model corresponding to the kind of an object on which state prediction is executed, a state series dictionary 203 that defines a series of plural state changes accompanying the lapse of time of a model, and a control parameter dictionary 204. The objective and target dictionary 201 includes an objective and target dictionary storage section 201a that stores objective and target dictionary data, and an objective and target dictionary editing section 201b that edits the objective and target dictionary data. Also, the state series dictionary 203 includes a state series dictionary storage section 203a that stores state series dictionary data, and a state series dictionary editing section 203b that edits the state series dictionary data. Editing mentioned here includes both of updating and deletion of the dictionary data.

(Objective and Target Dictionary)

In FIG. 3, an example of an objective and target dictionary is shown. In the objective and target dictionary, the kind of the object and its objective, and the parameter for achieving the objective are stored. For example, in the example of FIG. 3, with respect to an object of "cucumber", there are defined forcing culture of the cucumber as the objective 1, three phases of seeding, settled planting, and harvesting which show the growth process and the time of each phase as the target parameter for achieving the forcing culture of the cucumber. In FIG. 3, the target parameters where the harvest time is "January" and "February" are defined.

The objective and target dictionary has an objective that the harvesting efficiency of a crop observed by the CMOS sensor is made as high as possible (high profit and low cost) under a certain precondition (growth start time, harvest time, cultivar, and the like). For this objective, the target (value) is narrowed with respect to the growth condition of a crop observed by the CMOS sensor. The target corresponding to an objective is obtained by organizing the growth record data of the past as a dictionary which is the objective and target dictionary. The objective and target dictionary may be given as data in which the target (value) is tabulated with respect to the objective (value).

When the objective and the target of an object are given beforehand, they may be organized as a dictionary. When the evaluation reference of an object is given and the objective value and the target value are obtained by calculation and the like from observation values obtained by observation and the like of the object, the objective value and the target value may be organized as a dictionary. In other cases, when an evaluation point is given to an observation value obtained by observation and the like of an object from the outside, an observation value to which a highest evaluation point is given is made an objective value and a target value which may be organized as a dictionary, or otherwise when an evaluation reference of an object is given, an objective value and a target value are obtained by calculation and the like from observation values obtained by observation and the like of the object, an observation value that has become a highest evaluation reference is made an objective value and a target value which may be also organized as a dictionary.

In order that growth of a crop traces the target (value) toward the objective (value), there are appropriate target values with respect to the light quantity, temperature, and water quantity. The appropriate target values of the light quantity, temperature, and water quantity are narrowed when it is aimed to increase the harvesting efficiency of the crop in question as much as possible. Because the objective (value) of the light quantity, temperature, and water quantity in cultivation of a crop is to increase the harvesting efficiency of a crop as much as possible, the target corresponding to this objective becomes one obtained by organizing record data in cultivating a crop in the past as a dictionary. This is the objective and target dictionary of the light quantity, temperature, and water quantity.

The target (value) of the light quantity, temperature, and water quantity is tabulated with respect to the objective (value). A route (combination of the target (value)) of the light quantity, temperature, and water quantity from a certain precondition to an objective of increasing the harvesting efficiency as much as possible is not considered to be one route only. Because of the combination of the light quantity, temperature, and water quantity, the route is considered to increase to a number of possibilities; however, a number of such routes come to be recorded naturally by organizing growth record data of the past as a dictionary. When similar targets (values) are recorded, the target (value) is counted and becomes frequency data. The prediction value of a case where the objective and target dictionary is retrieved is outputted by the frequency data with probability being attached. A route of growth of a crop and a route of the light quantity, temperature, and water quantity become a combination related to each other.

[State Series Dictionary]

Figure 4A:
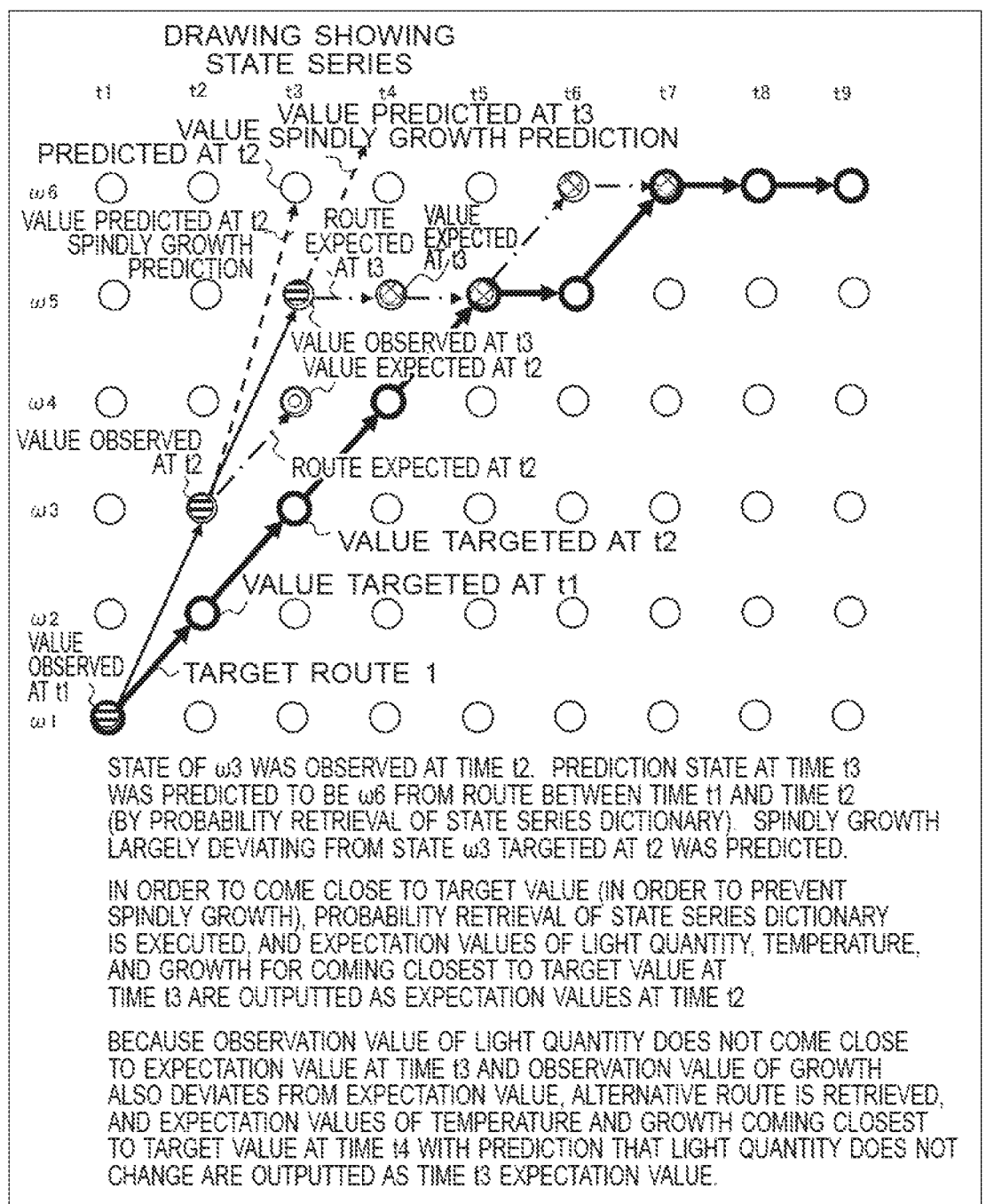
FIG. 4A is a drawing that shows an example of state series data stored in a state series dictionary.

In FIG. 4, an example of state series data stored in a state series dictionary is shown. The state series data of FIG. 3 are data that define a pattern of the state change along the time axis direction of an object, and are data arraying the state $\omega m$ (m=1-6) at the time point of the clock time tn (n=1-9). Also, to select one state cm at the clock time tn and to transit to the state $\omega m+1$ of the time of shifting to the next clock time for example the clock time tn+1 expresses change in the state, and data showing this state transition become the state series. In the present embodiment, a finite state series that defines a series of the state change (may be also called as the shape change since the shape changes) accompanying growth of a crop is applied, and a model configured of a finite state series that is obtained by modelling the shape of a crop of the initial state is prepared.

At that time, a dictionary in which the objective attribute and the target parameter are related to a crop or the growth environment of a crop is prepared, and can be used for searching of the state series. As examples of the objective of a crop itself, there are sprouting, growth, flower setting, flowering, fruition, firing, and so on, and as examples of the target parameter, there are the height of a stem, the size of a leaf, the number of piece of the leaf, the color of a leaf, the gap between leaves, the number of piece of the flower, the size of the fruit, the shape of the fruit, and so on. By using the objective attribute and the target parameter for searching of the finite state series, searching of the finite state series predicting the state of flowering and fruition from the time point when a flower bud and a fruit are not yet observed for example becomes possible.

Also, as examples of the growth environment, there are a heater for properly keeping the growing temperature of a crop and a thermometer for observing the temperature, a waterer for supplying water to a crop, lighting for giving light to a crop, and so on. When a growth schedule of a crop as a cultivation plan and control information of the temperature, water supply, and lighting of the growth environment are given from the outside as the objective attribute and the objective parameter, they are also used for searching of the finite state series to execute growth prediction of a crop and are used as prediction values for the temperature sensor of a heater, the water supply sensor of a waterer, and the illuminance sensor of lighting. When a deviation from an observation value is detected, by reversely searching the finite state series of a crop and growth environment so as to match the observation value, they may be outputted as excess and deficiency information of the temperature, water supply, lighting and the like and feedback information to controlling, may be outputted as abnormality detection of each sensor for the temperature, water supply, and lighting, and may be outputted as possibility information of the disease and insect damage.

[Model Dictionary]

In FIG. 5, an example of model dictionary data is shown. In the model dictionary, the kind of sensor and the object determined based on sensor information outputted from the sensor are defined. FIG. 5 is a model dictionary that defines an object, and a crop is defined as an object defined by an output from a CMOS sensor for example.

(Control Parameter)

Figures 6E, 7:
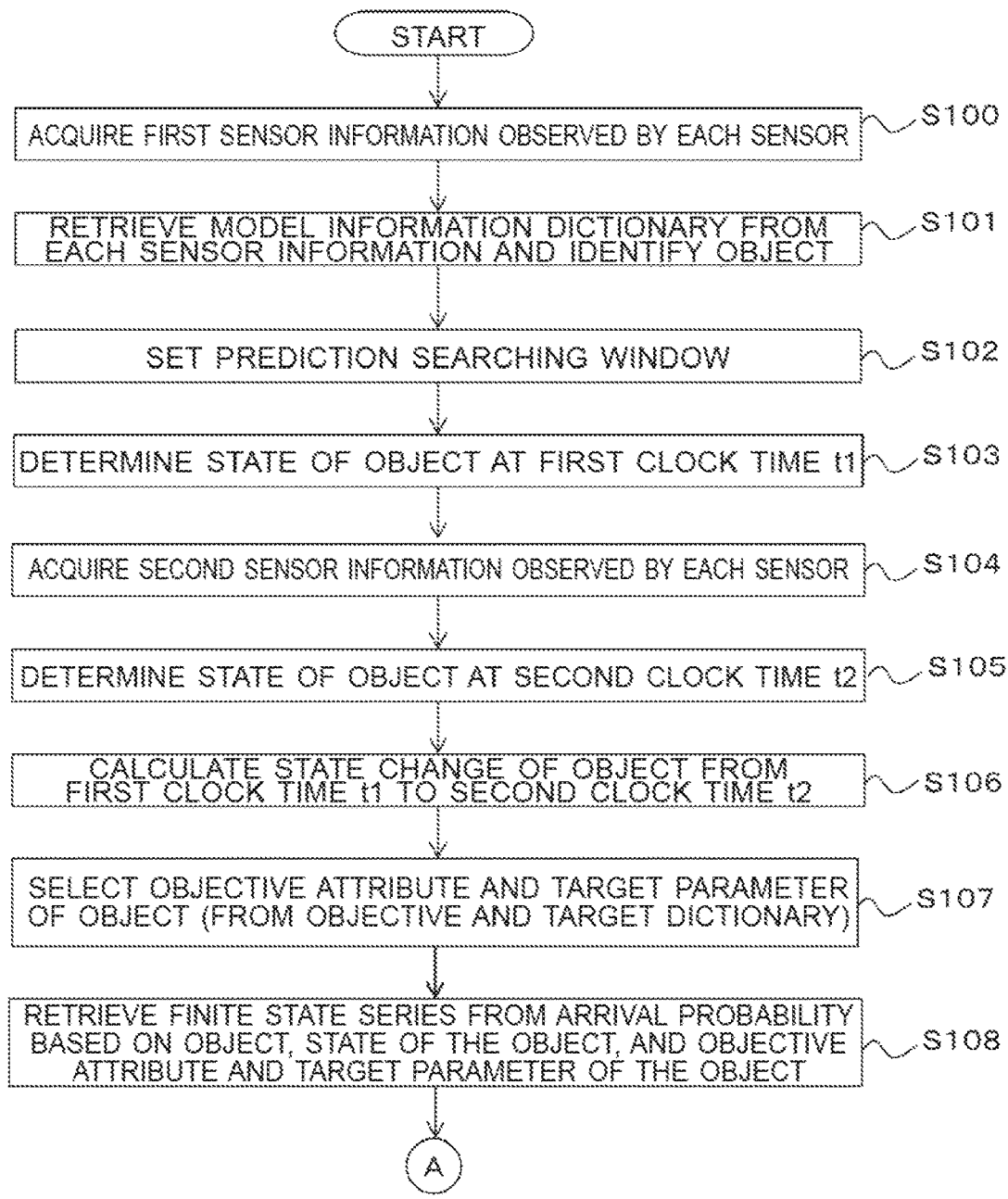
FIG. 6E is a drawing that shows an example of a control parameter outputted to a fertilizer supply nozzle.
FIG. 7 is a flowchart that shows a flow of a process executing state prediction control with respect to growth of a crop using a state prediction control apparatus according to the present embodiment.

In FIG. 6, an example of a control parameter dictionary is shown. FIG. 6A is an example of a control parameter outputted to the lighting 401, FIG. 6B is an example of a control parameter outputted to the heater 402, FIG. 6C is an example of a control parameter outputted to the humidifying-dehumidifying device 403, FIG. 6D is an example of a control parameter outputted to the water supply valve 404, and FIG. 6E is an example of a control parameter outputted to the fertilizer supply nozzle 405. The control parameter dictionary is given as data in which the values from the observation value to that after controlling are related to the difference of the expectation value and the observation value described below.

Next, a state prediction control process of an object executed in the state prediction control apparatus 10 of the present embodiment will be explained. FIG. 7 and FIG. 8 are flowcharts that show a flow of a process executing state prediction control with respect to growth of a crop using the state prediction control apparatus according to the present embodiment.

The sensor information acquisition section 14a acquires sensor information at the clock time t1 of each sensor (will be hereinafter referred to as "the first sensor information") from each of the observation sensors 30 (S100), and outputs the same to the object identification section 14b.

The object identification section 14b retrieves the model information dictionary 202, and identifies an object based on the first sensor information of each sensor (S101). In the model information dictionary 202, model information where the sensor kind and the object are related to each other, namely data where the object is defined to be "crop" when the sensor kind is "CMOS sensor" for example, is to be stored beforehand. Also, when the object identification section 14b acquires the first sensor information from the CMOS sensor, the object identification section 14b refers to the model information dictionary 202, and recognizes the object to be the crop if the first sensor information is acquired from the CMOS sensor.

When the object identification section 14b recognizes that there is new object information that does not appear in the model information dictionary, the object identification section 14b executes a process of adding new object information to the model dictionary and updating the model dictionary.

The object identification section 14b sets a period where a state prediction control process of an object within an actual world is executed (will be referred to as a prediction searching window) (S102). In the present embodiment, a prediction searching window is set which is defined to be the time when the object is observed at a constant interval (refer to the reference sign 61 of FIG. 10). In the present example, the constant interval described above is determined to be a predetermined interval namely one week for example as an example of the time interval in which growth of a crop can be compared.

The object identification section 14b observes the object by the first sensor information within the prediction searching window, and determines the state of the object (S103). For example, the object identification section 14b determines the state (shape) of the crop at the first clock time t1 based on the first sensor information outputted from the CMOS sensor at the first clock time t1 that is included in the time defined to be the prediction searching window. Also, the object identification section 14b determines the moisture quantity at the first clock time t1 based on the first sensor information outputted from the water quantity sensor at the first clock time t1. In addition, the object identification section 14b determines a state at the first clock time t1 of the object determined based on each sensor included in the observation sensors 30.

The sensor information acquisition section 14a acquires sensor information of each sensor includes in the observation sensors 30 at the second clock time t2 that is included within the prediction searching window and is after the first clock time t1 (will be hereinafter referred to as "the second sensor information") (S104).

Also, in a similar manner to the step S103, the object identification section 14b determines the state of the object based on the second sensor information (S105).

Further, the state prediction section 14c calculates the change quantity between the state at the first clock time t1 determined in S103 and the state at the second clock time t2 determined in S106 with respect to each object, and calculates the state change of the object from the first clock time t1 to the second clock time t2 of each object (S106).

The state prediction section 14c retrieves the objective and target dictionary 201 with respect to the determined object, and selects the objective attribute and the target parameter of the object (S107).

The state prediction section 14c retrieves the finite state series based on the object, the state of the object, and the objective attribute and the target parameter of the object, and selects at least one or more finite state series among the retrieved finite state series based on the arrival probability (S108). To be more specific, the state prediction section 14c calculates the square sum value of the difference between the observation value and the target value among the nodes of the finite state series, and retrieves a node where the square sum value is the smallest in the finite state series.

The state prediction section 14c applies a selected series or plural series with high arrival probability at the time point of the retrieval to the object (S109). "To apply a series or plural series to the object" mentioned here means to determine the series having been narrowed as described above to be the state series of the object. The value of the node of the series applied is made the target value.

The state prediction section 14c superposes the change vector of the object on the selected series (S110). When the object is observed, the state prediction section 14c calculates the change value between the difference value 1 and the difference value 2. The difference value 1 is difference value between sensor information value of the object at the observation time point and the node of the state series applied before. The difference value 2 is difference value between sensor information value of the object at the next observation time point and the node of the state series applied the time point of the next observation. These are made the change vector of the object. Further, the expectation value of the next observation time point is made a value obtained by superposing the change vector obtained above namely the change value of the difference value and the difference value on the node of the applied state series of the time point of the next observation.

The state prediction section 14c updates searched state series frequency (S111). Out of the frequency of the entire state series of the object, the frequency of the applied state series arriving the objective and the target is made the arrival probability. Also, when the object has got a new state series, the state prediction section 14c executes updating of adding the new state series. The initial value of the frequency of the new state series is 1.

The state prediction section 14c outputs state prediction (S112). The state prediction section 14c outputs, as a prediction value, a value obtained by superposing the change vector obtained above namely the change value of the difference value and the difference value on the node of the applied state series of the time point of the next observation obtained by superposition of the change vector of the object in the step S114.

The prediction evaluation section 14d evaluates the outputted prediction value namely the result of the state prediction (S113). The state prediction is evaluated by calculating the arrival probability from the node to the objective and the target as an evaluation function.

In the present embodiment, four kinds of data are outputted which are (1) the difference value of the sensor value (target value-observation value, target value-prediction value, expectation value-observation value), (2) the signed value corresponding to increase and decrease (the observation time point of the last time and the observation time point of this time) of the difference value of the sensor value, (3) the arrival probability from a node of the prediction value to a node of the objective and target value, the arrival probability from a node of the observation value to a node of the objective and target value, and the arrival probability from a node of the expectation value to a node of the objective and target value, (4) the signed value corresponding to increase and decrease (difference value between value of the observation time point of the last time and value of the observation time point of this time) of the arrival probability from a node of the prediction value to a node of the objective and target value, the signed value corresponding to increase and decrease (difference value between value of the observation time point of the last time and value of the observation time point of this time) of the arrival probability from a node of the observation value to a node of the objective and target value, and the signed value corresponding to increase and decrease (difference value between value of the observation time point of the last time and value of the observation time point of this time) of the arrival probability from a node of the expectation value to a node of the objective and target value. Out of them, (3) and (4) are outputted in the present step.

The prediction evaluation section 14d retrieves the state series that comes close to the target (S114). In concrete terms, the prediction evaluation section 14d compares the arrival probability to the objective and the target from the node of the applied time point and the arrival probability to the objective and the target from the closest node of the prediction value to each other. When the arrival probability has reduced, the prediction evaluation section 14d retrieves a node whose arrival probability is higher compared to the closest node of the prediction value. When the arrival probability has increased, retrieval is not executed.

The matching section 14f compares the observation value indicated by the second sensor information and the prediction information outputted by the state prediction section 14c to each other, and outputs the comparison result to the prediction evaluation section 14d. The prediction evaluation section 14d outputs at least one of evaluation information and expectation value (described "evaluation information/expectation value" below) based on this comparison result (S115). As the comparison result described above, the differential value of the observation value and the prediction value is used for example.

The prediction evaluation section 14d outputs a node whose arrival probability to the objective and the target is higher compared to the closest node of the prediction value retrieved in the step S118 as the expectation value. When the arrival probability to the objective and the target has increased in the step S115, the prediction evaluation section 14d outputs the closest node of the prediction value as the expectation value.

The prediction evaluation section 14d outputs the values described below as the evaluation information.

(1) The difference value of the sensor value (target value-observation value, target value-prediction value, expectation value-observation value)

When the observation value deviates from the target value and a difference is generated, the difference is outputted as the evaluation value.

When the prediction value deviates from the target value and a difference is generated, the difference is outputted as the evaluation value.

When the observation value deviates from the expectation value and a difference is generated, the difference is outputted as the evaluation value.

(2) The signed value corresponding to increase and decrease (the observation time point of the last time and the observation time point of this time) of the difference value of the sensor value When the observation value deviates from the target value, a difference is generated, and the difference has increased, a minus value is outputted as the evaluation of the non-preferable direction.

When the observation value deviates from the target value, a difference is generated, and the difference has decreased, a plus value is outputted as the evaluation of the preferable direction.

When the prediction value deviates from the target value, a difference is generated, and the difference has increased, a minus value is outputted as the evaluation of the non-preferable direction.

When the prediction value deviates from the target value, a difference is generated, and the difference has decreased, a plus value is outputted as the evaluation of the preferable direction.

When the observation value deviates from the expectation value, a difference is generated, and the difference has increased, a minus value is outputted as the evaluation of the non-preferable direction.

When the observation value deviates from the expectation value, a difference is generated, and the difference has decreased, a plus value is outputted as the evaluation of the preferable direction.

The control section 14e outputs the control information (S116). Based on the evaluation value formed of the difference between the observation value and the expectation value outputted in the step S115, the control section 14e refers to the control parameter dictionary 204, and outputs the control information with respect to each object. For example, when the difference between the expectation value and the observation value of the light quantity is "800-1199 or more" and the lighting voltage at the time of observation obtained from the second sensor information is 3, as shown in FIG. 6A, the control information after control which indicates the value of the lighting voltage is "0" is outputted.

Figure 9A:
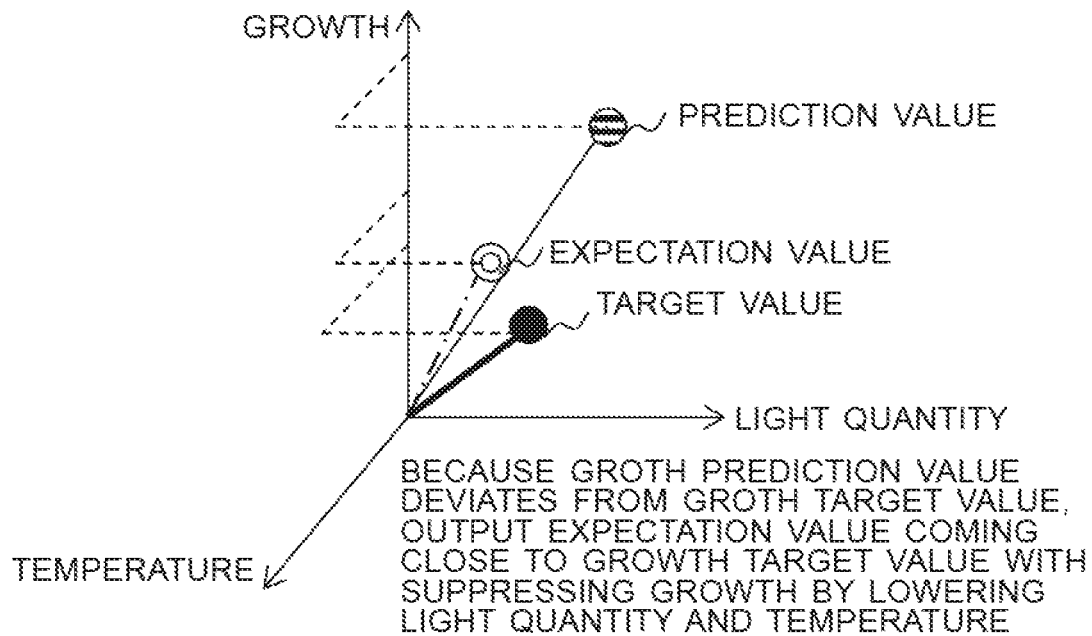
FIG. 9A is a drawing that shows an example of changing a control parameter based on a prediction evaluation result.
Figure 9B:
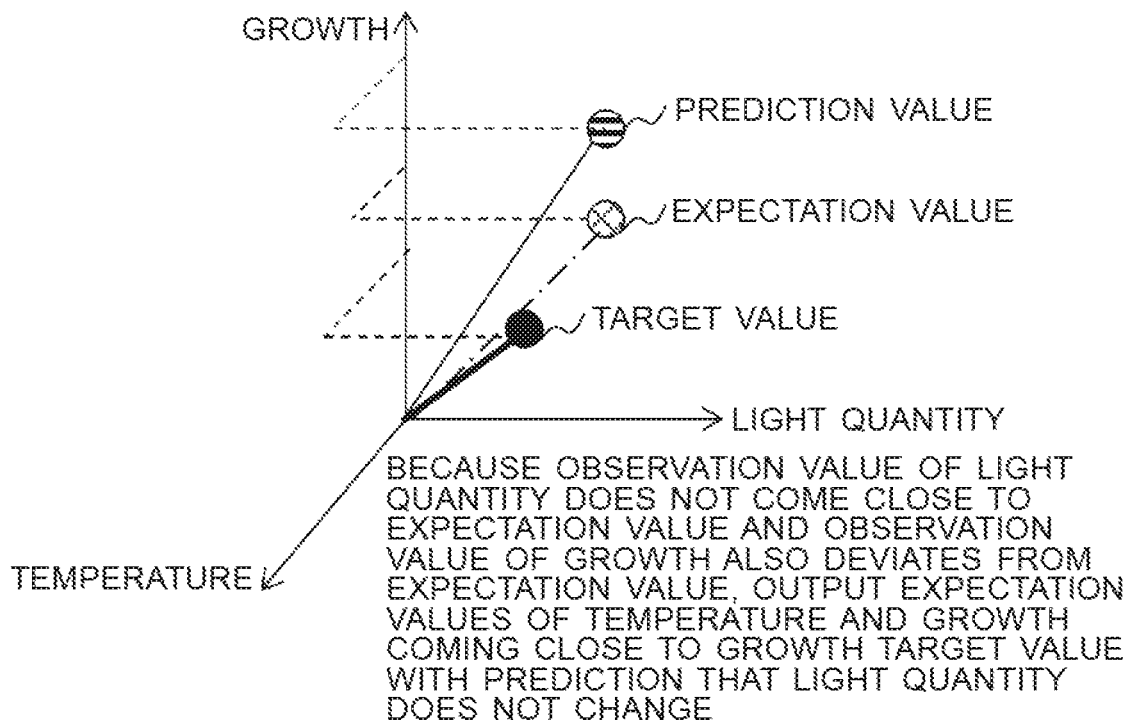
FIG. 9B is a drawing that shows an example of changing a control parameter based on a prediction evaluation result.
Figure 10:
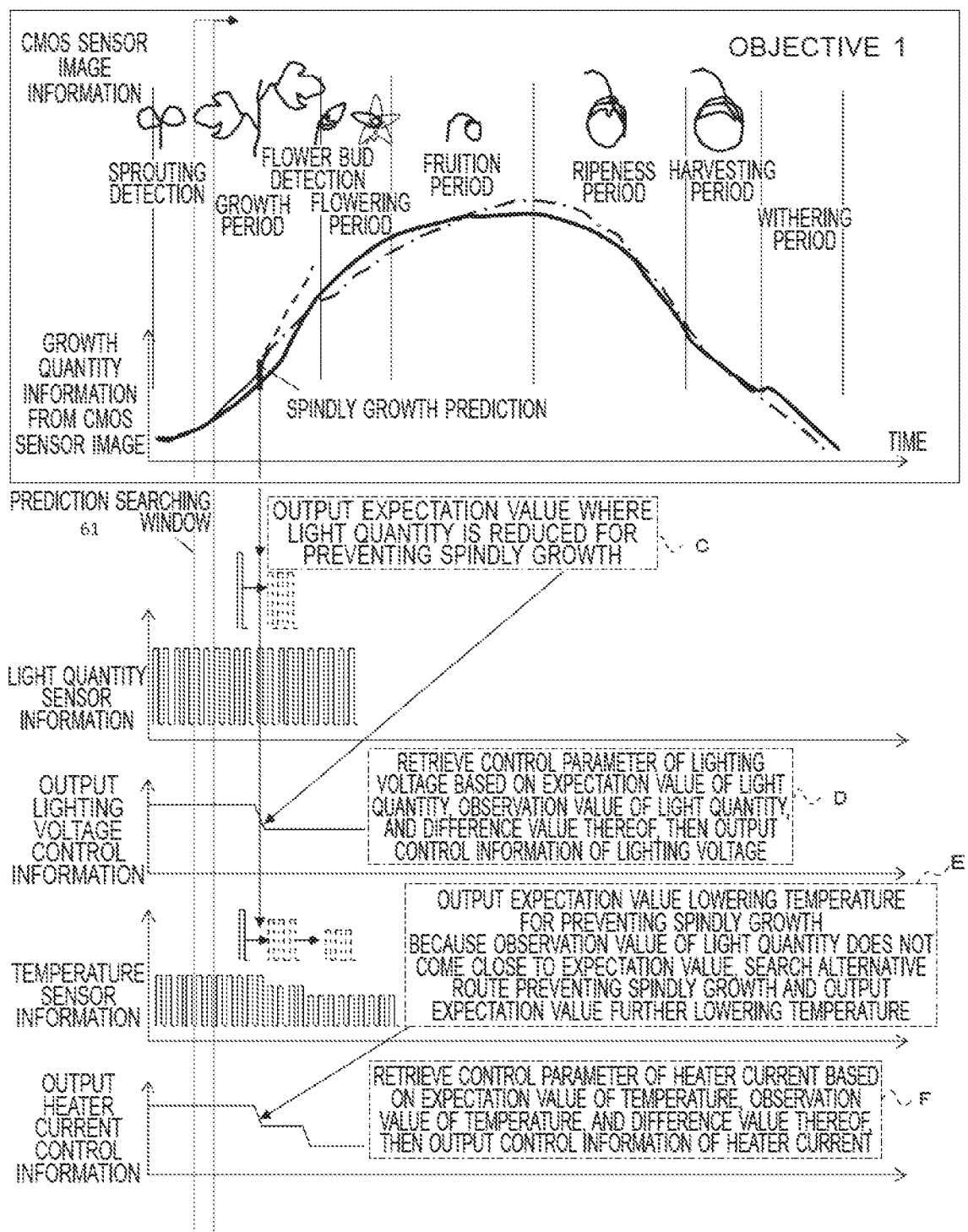
FIG. 10 is a drawing that shows an example of growth prediction of a crop and a control parameter according to the growth prediction.

Retrieval of the state series will be explained referring to FIG. 4, FIG. 9A, FIG. 9B, and FIG. 10. It is assumed that a state ω1 of the first clock time t1 (this is an observation state since it is an actually observed state) has been obtained based on the first sensor information. Also, a targeted state value is referred to as a target value, a predicted state value is referred to as a prediction value, an observed state value is referred to as an observation value, and an expected state value is referred to as an expectation value. FIG. 9A and FIG. 9B are drawings that show an example of changing a control parameter based on a prediction evaluation result. Also, FIG. 10 is a drawing that shows an example of growth prediction of a crop and a control parameter according to the growth prediction.

It is assumed that the state prediction section 14c observed the state ω at the second clock time t2. In this case, the state prediction section 14c generates a route connecting the state ω1 of the first clock time t1 (this is an observation state since it is an observed state) and the state ω3 of the second clock time t2 (this is an observation state since it is an observed state). Then the state prediction section 14c extends the route and predicts the state at the third clock time t3 to be ω6 (by probability searching of the state series dictionary).

Meanwhile, in the objective and target dictionary 201, for a crop, it is assumed that there is set a target route connecting the state ω2 of the first clock time t1 (this is a target state since it is a targeted state) and the state ω3 of the second clock time t2 (this is a target state since it is a targeted state).

In this case, at the second clock time t2, the state became the state ω6 (this is a predicted state) in contrast with the state ω3 (this is a targeted state state), and a considerably deviated spindly growth was observed.

Therefore, in order to come close to the target value (in order to prevent the spindly growth), the control section 14e executes probability searching of the state series dictionary, and outputs the expectation values of the light quantity, temperature, and growth for coming closest to the target value at time t3 are outputted as time t2 expectation values.

Because the observation value of the light quantity does not come close to the expectation value at the third clock time t3 and the observation value of the growth also deviates from the expectation value, the control section 14e searches an alternative route, and outputs the expectation values of the temperature and growth coming closest to the target value at the time t4 with a prediction that the light quantity does not change as a time t3 expectation value.

When the expectation value at the second clock time t2 is a spindly growth, it is necessary to adjust the control parameter so as to delay growth of the crop. Therefore, in order to come close to the target value (in order to prevent the spindly growth), the control section 14e executes probability searching of the state series dictionary, and outputs the expectation values of the light quantity, the temperature, and the growth for coming closest to the target value at the time t3 as time t2 expectation values. As a result, as shown in the light quantity sensor information of FIG. 9A and FIG. 10, the expectation values where the light quantity and the temperature are lowered in order to prevent the spindly growth are outputted, and the expectation values of the light quantity and the temperature are outputted by a prior method separately from the expectation values.

When the observation value of the light quantity does not come close to the expectation value at the time t3 and the observation value of the growth also deviates from the expectation value in spite that the control parameter tried to adjust the light quantity, an alternative route is searched, and the expectation values of the temperature and growth coming closest to the target value at the time t4 with a prediction that the light quantity does not change are outputted as time t3 expectation values. As a result, as shown in FIG. 9B and FIG. 10, since the observation value of the light quantity does not come close to the expectation value, an alternative route for preventing the spindly growth is searched, and an expectation value for further lowering the temperature is outputted.

The state prediction section 14c updates the object and the arrival probability of the objective and target dictionary (S117). In FIG. 4B, an example of an update of the state series data of the state series dictionary is shown. In the state series dictionary, each state has a state series frequency counter and a state counter, and the state prediction section 14c updates the state series frequency counter and the state counter whenever the state transition is observed. An example of an update of the state transition probability is shown below.

Example

In observing the state transition of ωn→ωn+1

| State series frequency counter | ωn→ωn + 1 count-up |
| State counter | ωn + 1 count-up |

The state series dictionary has the state transition probability data, obtains the state transition probability P(ωn→ωn+1) by the equation (1) below based on the state series frequency, and updates the state transition probability.

$$P(\omega n \rightarrow \omega n+1) = \omega n \rightarrow n+1 \text{ count}/\omega n \text{ count} \quad (1)$$

Thus, the state transition probability of the objective and target dictionary can be updated using the observation result of the state transition, and accuracy of the state prediction can be further improved.

According to the present embodiment, the state of the observation object can be predicted, and the evaluation information for making the state prediction come close to the target value can be obtained. Therefore, based on this evaluation information, the factors affecting the state of the observation object can be changed so that a future state of the observation object comes close to the target value.

Further, in the present embodiment, the control parameters can be changed so that the state prediction of the observation object comes close to the target value using the control section 14e.

Also, since the state series dictionary 203 and the objective and target dictionary 201 are updated by the state series dictionary editing section 203b and the objective and target dictionary editing section 201b based on the data of the observation object actually obtained, it can be expected to improve the state prediction accuracy.

The embodiment described above is not intended to limit the present invention, and various modifications not deviating from the gist of the present invention are to be included in the technical range of the present invention.

For example, in the step S111 described above, the state series dictionary editing section 203b puts an update flag to a focused state, adds a corresponding frequency flag when it becomes definite to arrive the objective and the target, and thereby updates the state transition probability. In response to this, in the step S117, the objective and target dictionary editing section 201b may update the objective and target arrival probability. At this time, when it becomes definite not to arrive the objective and the target, by adding the corresponding frequency flag, the state transition probability and the objective and target arrival probability are updated. Further, the state transition probability may be updated by putting an abnormal state transition flag when it is proved to be an abnormal case and adding a corresponding frequency flag.

Furthermore, when an anticipated state at the second clock time is a state not stored in the state series dictionary due to the change speed or acceleration, and when the observation state is a state not stored in the state series dictionary, the state series dictionary editing section may register an update flag, a flag that shows to be in a new state, and a corresponding new frequency flag to update the state series dictionary memory.

REFERENCE SIGNS LIST

10 . . . State prediction control apparatus
14 . . . CPU
16 . . . ROM
18 . . . RAM
20 . . . File unit
22 . . . External I/F
24 . . . Monitor
26 . . . Bus
30 . . . Observation sensor
40 . . . Control unit

The invention claimed is:

1. A state prediction control apparatus, comprising:
a sensor information acquisition section that acquires first sensor information obtained by observing a state of an observation object at a first clock time by an observation sensor;
a model dictionary storage section that stores a model dictionary which relates the observation sensor and an observation object determined directly from an output of the observation sensor;
an object identification section that refers to the model dictionary and identifies the observation object based on the first sensor information;
an objective and target dictionary storage section that stores an objective and target dictionary which defines an objective of the observation object and a target parameter for achieving the objective;
a state series dictionary storage section that stores a state series dictionary which defines a series of a plurality of state changes accompanying a lapse of time corresponding to the observation object;
a state prediction section that reads a state series which defines a different state of a different clock time of the identified observation object by a plurality from the state series dictionary, reads an objective and a target parameter of the observation object from the objective and target dictionary, obtains a route according to the objective and the target parameter having been read among the state series, and predicts a state of the observation object at a prediction clock time that is after the first clock time to obtain a prediction state;
a prediction evaluation section that compares second sensor information and the prediction state, the second sensor information being obtained by observing the observation object by the observation sensor at a second clock time that is after the first clock time, and based on the comparison result, outputs evaluation information of deviation of the observation state of the observation object at the prediction clock with respect to the objective and the target parameter; and
a control section that outputs a control parameter to a control unit which contributes to state change of the observation object so that an observation state of the observation object at the prediction time comes close to the objective and the target parameter, wherein
the prediction evaluation section further outputs an expectation value whose arrival probability to the objective and the target parameter is higher than those of the prediction state so that an observation state of the observation object at the prediction clock time comes close to the objective and the target parameter,
the control section outputs a control parameter to the control unit so that the observation object achieves the expectation value,
the observation object is a crop,
the observation sensor is a camera,
the control unit is one of a lighting system, a heater, a humidifying-dehumidifying device, a water supply valve, and a fertilizer supply nozzle, or an arbitrary combination thereof,
the sensor information acquisition section acquires a first image in which the crop is photographed at the first clock time by the camera,
the object identification section identifies the crop,
the object and target dictionary storage section defines a cultivation objective of the crop and a target parameter for achieving the cultivation objective,
the state series dictionary storage section stores a state series dictionary which defines a series of a plurality of state changes accompanying a lapse of time corresponding to the crop,
the state prediction section obtains a state series according to the cultivation objective of the crop and the target parameter among the plurality of state series, and applies a state of the crop indicated by the first image to the state series as obtained to predict a state of the crop at a second clock time that is after the first clock time,
the prediction evaluation section outputs an expectation value in which a state of the crop comes closer to the objective and the target parameter than a prediction value at the second clock time, and
the control section outputs a control parameter to the control unit so that the expectation value is achieved.

2. The state prediction control apparatus according to claim 1, further comprising:
a state series dictionary editing section that compares second sensor information and the prediction state, the second sensor information being obtained by observing the observation object by the observation sensor at a second clock time that is after the first clock time, and updates the state series dictionary from a state of the first clock time to a state of the second clock time when second sensor information and the prediction state are different from each other based on the comparison result.

3. The state prediction control apparatus according to claim 2, further comprising:
an objective and target dictionary editing section that updates the objective and target dictionary when the state series dictionary editing section updates the state series dictionary.

4. A state prediction control method, comprising:
acquiring first sensor information obtained by observing a state of an observation object at a first clock time by an observation sensor;
referring to a model dictionary that relates the observation sensor and an observation object determined directly from an output of the observation sensor and identifying the observation object based on the first sensor information;
reading a state series that defines a different state of a different clock time of the identified observation object by a plurality from a state series dictionary which defines a series of a plurality of state changes accompanying a lapse of time corresponding to the observation object, reading an objective and a target parameter of the observation object from an objective and target dictionary which defines an objective of the observation object and a target parameter for achieving the objective, obtaining a route according to the objective and the target parameter having been read among the state series, and predicting a state of the observation object at a prediction clock time that is after the first clock time to obtain a prediction state;

comparing second sensor information and the prediction state, the second sensor information being obtained by observing the observation object by the observation sensor at a second clock time that is after the first clock time, and outputting evaluation information of deviation of the observation state of the observation object at the prediction clock with respect to the objective and the target parameter based on the comparison result; and outputting a control parameter to a control unit which contributes to state change of the observation object so that an observation state of the observation object at the prediction time comes close to the objective and the target parameter, outputting an expectation value whose arrival probability to the objective and the target parameter is higher than those of the prediction state so that an observation state of the observation object at a prediction clock time comes close to an objective and a target parameter, and outputting a control parameter to the control unit so that the observation object achieves the expectation value, wherein the observation object is a crop,
the observation sensor is a camera,
the control unit is one of a lighting system, a heater, a humidifying-dehumidifying device, a water supply valve, and a fertilizer supply nozzle, or an arbitrary combination thereof, and the state prediction control method further comprises:
acquiring a first image in which the crop is photographed at the first clock time by the camera,
identifying the crop,
defining a cultivation objective of the crop and a target parameter for achieving the cultivation objective,
storing a state series dictionary which defines a series of a plurality of state changes accompanying a lapse of time corresponding to the crop,
obtaining a state series according to the cultivation objective of the crop and the target parameter among the plurality of state series, applying a state of the crop indicated by the first image to the state series as obtained to predict a state of the crop at a second clock time that is after the first clock time,
outputting an expectation value in which a state of the crop comes closer to the objective and the target parameter than a prediction value at the second clock time, and
outputting a control parameter to the control unit so that the expectation value is achieved.

5. The state prediction control method according to claim 4, further comprising:
comparing second sensor information and the prediction state, the second sensor information being obtained by observing the observation object by the observation sensor at a second clock time that is after the first clock time, and updating a state series dictionary from a state of the first clock time to a state of the second clock time when second sensor information and a predicted state are different from each other based on the comparison result.

6. The state prediction control method according to claim 5, further comprising:
updating the objective and target dictionary when the state series dictionary is updated.

7. The state prediction control apparatus according to claim 1, wherein
the control unit is the lighting system,
the state prediction section predicts spindly growth of the crop as a state of the crop, and
when a prediction value of the spindly growth of the crop is smaller than the expectation value, the control section outputs a control parameter to the lighting system so as to increase a light quantity, and when the prediction value of the spindly growth of the crop is greater than the expectation value, the control section outputs a control parameter to the lighting system so as to decrease the light quantity.

8. The state prediction control method according to claim 4, wherein
the control unit is the lighting system, and
the state prediction control method further comprises:
predicting spindly growth of the crop as a state of the crop,
when a prediction value of the spindly growth of the crop is smaller than the expectation value, outputting a control parameter to the lighting system so as to increase a light quantity, and
when the prediction value of the spindly growth of the crop is greater than the expectation value, outputting a control parameter to the lighting system so as to decrease the light quantity.

* * * * *